(12) United States Patent
Kojima et al.

(10) Patent No.: US 7,705,984 B2
(45) Date of Patent: Apr. 27, 2010

(54) SPECTROSCOPE HAVING SPECTROSCOPIC PATHS WITH INDIVIDUAL COLLIMATORS

(75) Inventors: Manabu Kojima, Musashino (JP); Tsutomu Kaneko, Musashino (JP); Toshikazu Yamamoto, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 12/354,288

(22) Filed: Jan. 15, 2009

(65) Prior Publication Data

US 2009/0190127 A1    Jul. 30, 2009

(30) Foreign Application Priority Data

Jan. 25, 2008  (JP) .............................. 2008-015031

(51) Int. Cl.
*G01J 3/28*  (2006.01)
(52) U.S. Cl. ...................................................... 356/328
(58) Field of Classification Search ......... 356/326–328, 356/334
See application file for complete search history.

(56) References Cited

U.S. PATENT DOCUMENTS

2005/0073679 A1* 4/2005 He et al. ..................... 356/328

FOREIGN PATENT DOCUMENTS

JP             08-159877 A    6/1996

* cited by examiner

*Primary Examiner*—Tarifur Chowdhury
*Assistant Examiner*—Abdullahi Nur
(74) *Attorney, Agent, or Firm*—Sughrue Mion, PLLC

(57) ABSTRACT

A spectroscope includes a diffraction grating having a plurality of ruled parallel lines; and a plurality of spectroscopic paths, each of which has a collimator for collimating incident light, emits the collimated light to the diffraction grating, and emits return light, which returns from the diffraction grating, through a slit provided on the path. In the spectroscope, measured light is emitted through the plurality of spectroscopic paths so as to extract light which is included in the measured light and has a predetermined wavelength; and the collimators of the spectroscopic paths are arranged so that irradiation areas of light emitted from the collimators are offset from each other at least in a direction along the ruled parallel lines. The collimators of the spectroscopic paths may be arranged so that incident angles of light emitted from the collimators coincide with each other.

4 Claims, 5 Drawing Sheets

SPECTROSCOPE HAVING SPECTROSCOPIC PATHS WITH INDIVIDUAL COLLIMATORS

BACKGROUND OF THE INVENTION

1. Field of the Invention

The present invention relates to a spectroscope for extracting a desired wavelength component included in measured light by launching the measured light into a diffraction grating so as to perform spectroscopic measurement.

Priority is claimed on Japanese Patent Application No. 2008-015031, filed Jan. 25, 2008, the contents of which are incorporated herein by reference.

2. Description of the Related Art

In a known spectroscope for obtaining a high resolution or a wide dynamic range in spectroscopic characteristics, a multipath system is employed in which measured light is launched into a diffraction grating a plurality of times, and also transmitted through a plurality of slits. As a spectroscope having a multipath system, Patent Document 1 (Japanese Unexamined Patent Application, First Publication No. H08-159877) discloses a Littrow double-path monochromator.

As shown in Patent Document 1, the disclosed double-path monochromator has a diffraction grating, a collimator, and two slits. The measured light emitted from a light-emitting device such as an optical fiber is collimated by the collimator, and is launched into the diffraction grating. The diffracted light is converged by the same collimator, and is transmitted through the first slit. The diffracted light which passed through the first slit is collimated again by the collimator, so as to direct the light into the diffraction grating. The diffracted light is converged again by the same collimator, and is transmitted through the second slit.

That is, the double-path monochromator disclosed in Patent Document 1 has a first spectroscopic path from the light-emitting device to the first slit and a second spectroscopic path from the first slit to the second slit, wherein the measured light is transmitted through the first spectroscopic path and the second spectroscopic path in turn.

In the above-described double-path monochromator, the measured light is spectroscopically dispersed via the first spectroscopic path, and is further spectroscopically dispersed via the second spectroscopic path. Therefore, it is possible to obtain effects similar to those obtained when two optical filters are serially arranged on the optical path of the measured light, and thus to obtain a high resolution and a wide dynamic range.

In the above structure, the first and second slits are separate parts, and cannot be disposed at the same (spatial) position. Therefore, in the double-path monochromator, the incident angle of the measured light on the diffraction grating in the first spectroscopic path is not equal to that of the measured light in the second spectroscopic path, so that the emission angle of the diffracted light in the first spectroscopic path is not equal to that of the diffracted light in the second spectroscopic path, thereby separating the optical path of the diffracted light in the first spectroscopic path from that of the diffracted light in the second spectroscopic path. Accordingly, it is possible to transmit the measured light through both the first and second slits, which are separately arranged.

However, when the measured light is launched into a diffraction grating, not only diffracted light but also scattered light, which is emitted in all directions, are produced. In addition, the known double-path monochromator uses a single collimator in both the first and second spectroscopic paths, so that the measured light emitted from the collimator on the first spectroscopic path and measured light emitted from the collimator on the second spectroscopic path irradiate the same area of the diffraction grating.

Therefore, part of the scattered light, which is produced when the measured light is launched into the diffraction grating on the first spectroscopic path, is emitted in the same direction as the emission direction of the diffracted light on the second spectroscopic path, and thus is superimposed on the diffracted light on the second spectroscopic path. Accordingly, the superimposed light is transmitted through the second slit.

In the double-path monochromator, the scattered light in the superimposed light (together with the diffracted light on the second spectroscopic path) functions as inevitable stray light which degrades the resolution and dynamic range in the spectroscopic characteristics.

Such a problem relates, not only to any double-path monochromator in which the measured light passes through two slits, but also to any multipath spectroscope in which measured light passes through a plurality of slits. That is, when part of the scattered light, which is produced on a spectroscopic path prior to the last spectroscopic path, passes along the same optical path as that of the diffracted light on the last spectroscopic path, the resolution and dynamic range in the spectroscopic characteristics degrade.

SUMMARY OF THE INVENTION

In light of the above circumstances, an object of the present invention is to provide a multipath spectroscope for preventing the resolution and dynamic range in the spectroscopic characteristics from degrading when part of the scattered light, which is produced on a spectroscopic path prior to the last spectroscopic path, passes along the same optical path as that of the diffracted light on the last spectroscopic path.

Therefore, the present invention provides a spectroscope comprising:

a diffraction grating having a plurality of ruled parallel lines; and a plurality of spectroscopic paths, each of which has a collimator for collimating incident light, emits the collimated light to the diffraction grating, and emits return light, which returns from the diffraction grating, through a slit provided on the path, wherein:

measured light is emitted through the plurality of spectroscopic paths so as to extract light which is included in the measured light and has a predetermined wavelength; and the collimators of the spectroscopic paths are arranged so that irradiation areas of light emitted from the collimators are offset from each other at least in a direction along the ruled parallel lines.

In accordance with the present invention having the above-described structure, it is possible to reduce the possibility such that the scattered light, which is produced through a spectroscopic path prior to the last spectroscopic path (which performs the final spectroscopic dispersion of the measured light, among the plurality of the spectroscopic paths) overlaps with the diffracted light on the last spectroscopic path. Therefore, in a multipath spectroscope, it is possible to prevent the degradation of the resolution and dynamic range in the spectroscopic characteristics, which is caused when part of the scattered light, which has been produced on a spectroscopic path prior to the last spectroscopic path, proceeds along the same optical path as that of the diffracted light on the last spectroscopic path.

Preferably, the collimators of the spectroscopic paths are arranged so that incident angles of light emitted from the collimators coincide with each other, where the incident angles are measured from a direction perpendicular to the ruled parallel lines.

Also preferably, the spectroscope further comprises:

a light guiding device for guiding the measured light between any two of the spectroscopic paths; and a light shield device arranged in at least a part of an area which is defined between said any two of the spectroscopic paths, except for the guide path of the light guiding device.

Also preferably, the spectroscope further comprises a reflection device for reflecting the return light at a predetermined emission angle so as to emit the return light to the diffraction grating.

BRIEF DESCRIPTION OF THE DRAWINGS

As shown in FIG. 1, the spectroscope 100 has a diffraction grating 1, a first collimator lens 2 (i.e., corresponding to one of the collimators of the present invention), a first slit 3, a second collimator lens 4 (corresponding to one of the collimators of the present invention), a second slit 5, and a light guide unit 6 (corresponding to the light guiding device of the present invention).

DETAILED DESCRIPTION OF THE INVENTION

Hereinafter, embodiments of the spectroscope in accordance with the present invention will be described with reference to the appended figures. In order to show each element in a recognizable manner in each figure, the dimension of each element is appropriately modified.

First Embodiment

Figure 1:
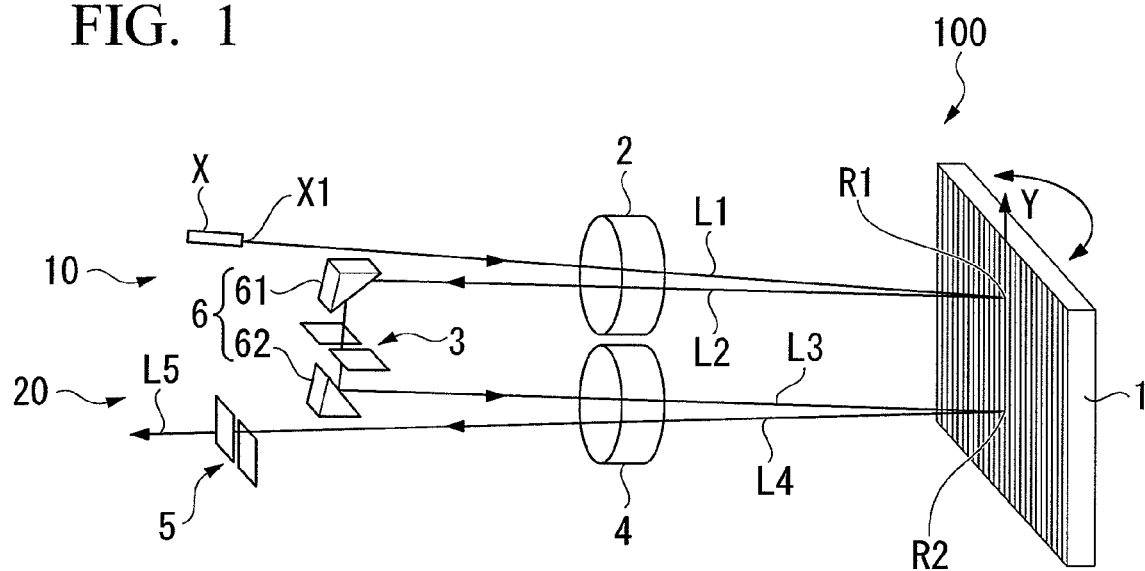
FIG. 1 is a schematic perspective view of a spectroscope 100 of a first embodiment.

FIG. 1 is a schematic perspective view of a spectroscope 100 of a first embodiment. As shown in FIG. 1, the spectroscope 100 has a diffraction grating 1, a first collimator lens 2 (i.e., corresponding to one of the collimators of the present invention), a first slit 3, a second collimator lens 4 (corresponding to one of the collimators of the present invention), a second slit 5, and a light guide unit 6 (corresponding to the light guiding device of the present invention).

The diffraction grating 1 is a reflection plate which has a plurality of ruled parallel lines arranged at regular intervals, so as to spectroscopically disperse incident light and emit diffracted light of the dispersed light.

The diffraction grating 1 can be rotated by a driving mechanism (not shown) around a rotation axis at the center of the diffraction grating 1 in the direction (see "Y" in FIG. 1) parallel to the ruled lines, so that the apparent interval between the ruled lines with respect to the incident light is variable.

The first collimator lens 2 collimates the incident light, and launches the collimated light into the diffraction grating 1. The first collimator lens 2 also converges the return light from the diffraction grating 1, and emits the converged light. The first collimator lens 2 is provided between the output end X1 of an optical fiber X, from which measured light L1 is launched into the spectroscope 100, and the diffraction grating 1.

When the measured light L1 emitted from the output end X1 of the optical fiber X is launched into the first collimator lens 2, the first collimator lens 2 collimates the measured light L1, launches the collimated light into the diffraction grating 1, and converges the diffracted light L2 (i.e., return light), which is emitted from the diffraction grating 1, so as to emit the converged light toward the optical fiber X.

The optical fiber X is arranged at a predetermined position for the spectroscope 100. Additionally, in the spectroscope 100 of the present embodiment, a predetermined positional relationship is always secured between the output end X1 and the first collimator lens 2.

The first slit 3 is positioned at the focus of the first collimator lens 2, and transmits only light L3 which is included in the diffracted light L2 and has a predetermined wavelength.

The predetermined wavelength of light L3, which passes through the first slit 3, varies depending on the rotation angle of the diffraction grating 1.

Similar to the first collimator lens 2, the second collimator lens 4 collimates the incident light, directs the collimated light into the diffraction grating 1, converges the return light from the diffraction grating 1, and emits the converged light. The second collimator lens 4 is provided between the first slit 3 and the diffraction grating 1.

When the light L3 emitted from the first slit 3 is directed into the second collimator lens 4, the second collimator lens 4 collimates the light L3, directs the collimated light into the diffraction grating 1, and converges the diffracted light L4 (i.e., return light), which is emitted from the diffraction grating 1, so as to emit the converged light toward the first slit 3.

The second slit 5 is positioned at the focus of the second collimator lens 4, and transmits only light L5 which is included in the diffracted light L4 and has a predetermined wavelength.

Accordingly, the spectroscope 100 of the present embodiment has a first spectroscopic path 10 formed by the first collimator lens 2 and the first slit 3, where the measured light L1 incident from the optical fiber X is collimated and launched into the diffraction grating 1 by means of the first collimator lens 2, and the diffracted light L2 from the diffraction grating 1 is emitted through the first slit 3. In accordance with the first spectroscopic path 10, the measured light L1 is spectroscopically dispersed, and part of the measured light L1 passes through the first slit 3, so that the light L3, which is included in the measured light L1 and has a predetermined wavelength, is emitted.

The spectroscope 100 of the present embodiment also has a second spectroscopic path 20 formed by the second collimator lens 4 and the second slit 5, where the light L3 incident from the first slit 3 is collimated and launched into the diffraction grating 1 by means of the second collimator lens 4, and the diffracted light L4 from the diffraction grating 1 is emitted through the second slit 5. In accordance with the second spectroscopic path 20, the light L3 is further spectroscopically dispersed, and part of the light L3 passes through the second slit 5, so that the light L5, which is included in the light L3 and has a predetermined wavelength, is emitted.

As described above, the spectroscope 100 of the present embodiment has a plurality of spectroscopic paths (the first spectroscopic path 10 and the second spectroscopic path 20) which each collimates incident light, directs the collimated light into the diffraction grating 1, and emits return light (the diffracted light L2 and L4) from the diffraction grating 1 via a slit (the first slit 3 and the second slit 5) provided in the spectroscope 100.

The light guide unit 6 has a function of guiding light between the first spectroscopic path 10 and the second spectroscopic path 20, and consists of a first reflection mirror 61 and a second reflection mirror 62. The first reflection mirror 61 is provided between the first collimator lens 2 and the first slit 3, and guides received light so that the light proceeds from the first collimator lens 2 to the first slit 3. The second reflection mirror 62 is provided between the first slit 3 and the second collimator lens 4, and guides received light so that the light proceeds from the first slit 3 to the second collimator lens 4.

More specifically, the first reflection mirror 61 guides the measured light L1, which has been transformed into the diffracted light L2 via the diffraction grating 1, so that the light proceeds from the first collimator lens 2 to the first slit 3. In addition, the second reflection mirror 62 guides the measured light L1, which has been transformed into the light L3 via the first slit 3, so that the light proceeds from the first slit 3 to the second collimator lens 4.

Figure 2:
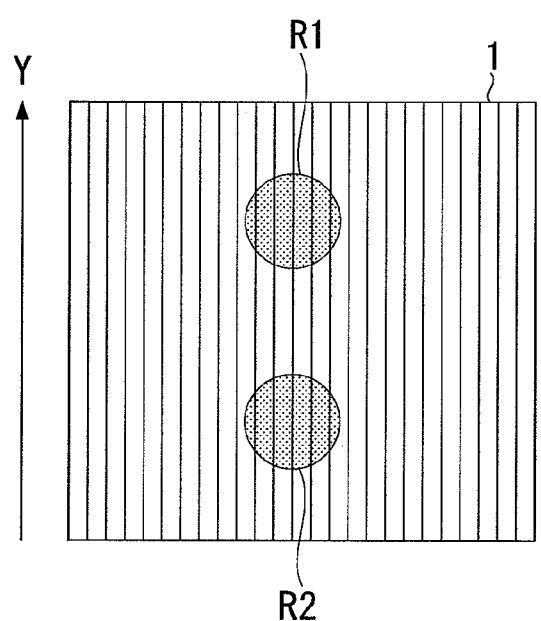
FIG. 2 is a schematic diagram showing the positional relationship between irradiation areas R1 and R2 in the spectroscope of the first embodiment.

In the spectroscope 100 of the present embodiment, the first collimator lens 2 and the second collimator lens 4 are arranged in a manner such that on the diffraction grating 1, the irradiation area R1 irradiated by the measured light L1 and the irradiation area R2 irradiated by the light L3 do not overlap with each other, and are offset from each other in the Y direction (along the ruled lines) (see FIG. 2).

That is, in the spectroscope 100 of the present embodiment, the first spectroscopic path 10 and the second spectroscopic path 20 each have a collimator lens (i.e., the first collimator lens 2 and the second collimator lens 4), and the first collimator lens 2 and the second collimator lens 4 are arranged in a manner such that the irradiation areas R1 and R3 irradiated by the light (i.e., measured light L1 and light L3) emitted from the collimator lens of each spectroscopic path are offset from each other in the direction along the ruled lines (i.e., Y direction).

When the irradiation area R1 of the measured light L1 and the irradiation area R2 of the light L3 do not overlap and are offset from each other in the Y direction on the diffraction grating 1, as described above, then scattered light, which is produced when the measured light L1 emitted from the first collimator lens 2 is launched into the diffraction grating 1, does not overlap with the optical path of the diffracted light L4.

Therefore, it is possible to prevent the scattered light, which is produced when the measured light L1 is launched into the diffraction grating 1, from proceeding along the same optical path as that of the diffracted light L4 and passing through the second slit 5. Accordingly, when receiving the target light L5 for the measurement by using a detector provided on the back side of the second slit 5, it is possible to prevent the scattered light from launching into the detector, and thus to prevent degradation of the resolution and dynamic range in the spectroscopic characteristics.

Figure 3:
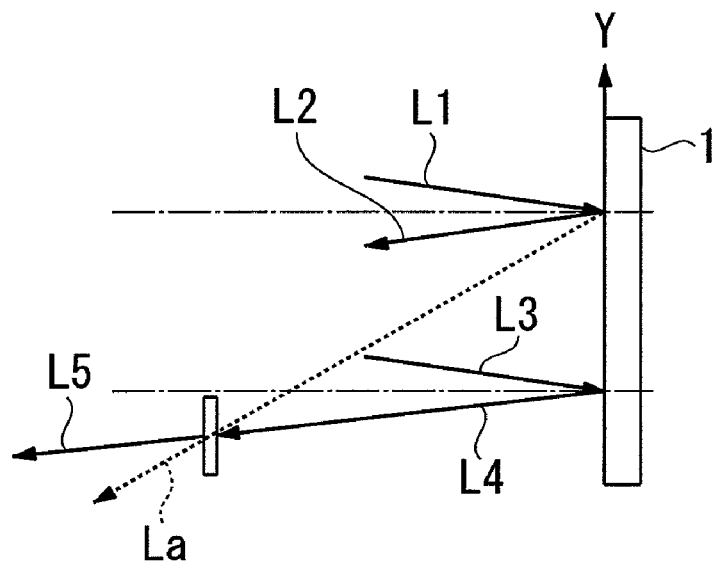
FIG. 3 is a schematic diagram showing scattered light produced when the measured light is incident on the diffraction grating in the spectro scope of the first embodiment.

Additionally, as shown in FIG. 3, a part "La" of the scattered light, which is produced when the measured light L1 is launched into the diffraction grating 1, proceeds straight toward the second slit 5, and thus passes through the second slit 5. However, the scattered light La and the target light L5 for the measurement do not proceed along the same optical path. Therefore, the scattered light La, which passes through the second slit 5, is not directed into the detector on the back side of the second slit 5.

Figure 4:
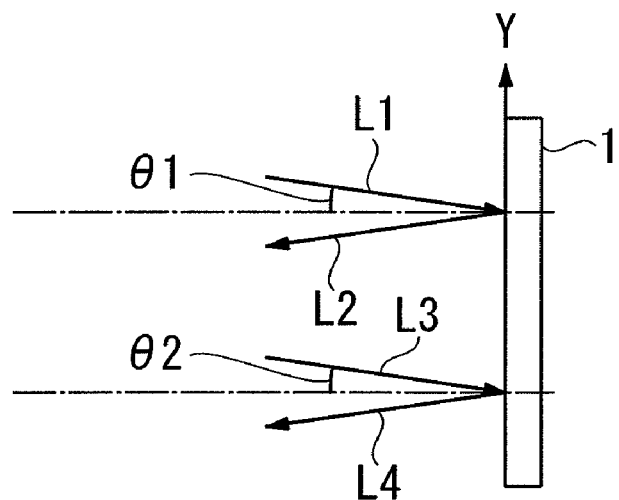
FIG. 4 is a schematic diagram showing the incident angle θ1 of the measured light L1 onto the diffraction grating and the incident angle θ2 of light, which has passed through the first slit, onto the diffraction grating, in the spectroscope of the first embodiment.

Also in the spectroscope 100 of the present embodiment, as shown in FIG. 4, the first collimator lens 2 and the second collimator lens 4 are arranged in a manner such that the incident angle $\theta 1$ of the measured light L1 emitted from the first collimator lens 2 onto the diffraction grating 1 coincides with the incident angle $\theta 2$ of the light L3 emitted from the second collimator lens 4 onto the diffraction grating 1, where each incident angle is measured from the direction perpendicular to the Y direction.

That is, in the spectroscope 100 of the present embodiment, the first collimator lens 2 and the second collimator lens 4 are arranged in a manner such that the incident angles (measured from the direction perpendicular to the Y direction) of the light (i.e., measured light L1 and light L3) emitted from the collimator lens (i.e., the first collimator lens 2 and the second collimator lens 4) provided in each spectroscopic path (i.e., the first spectroscopic path 10 and the second spectroscopic path 20) onto the diffraction grating 1 coincide with each other.

Below, with reference to FIGS. 5 and 6, a specific method for making the incident angle $\theta 1$ of the measured light L1 emitted from the first collimator lens 2 onto the diffraction grating 1 coincides with the incident angle $\theta 2$ of the light L3 emitted from the second collimator lens 4 onto the diffraction grating 1 will be explained.

Figure 5:
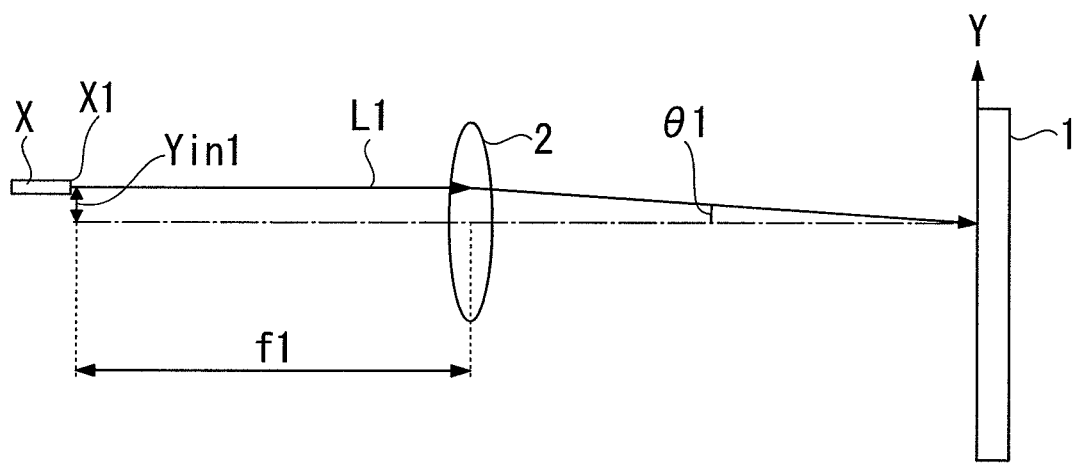
FIG. 5 is a schematic diagram used for explaining a method for making the incident angle θ1 of the measured light L1 and the incident angle θ2 of the light which has passed through the first slit coincide with each other in the spectroscope of the first embodiment.

As shown in FIG. 5, the incident angle $\theta 1$ (measured from the direction perpendicular to the Y direction) of the measured light L1 emitted from the first collimator lens 2 onto the diffraction grating 1 is represented by the following formula (1) by using the focal length f1 of the first collimator lens 2 and the height "Yin1" (generally called "image height") measured from the optical axis of the first collimator lens 2 to the output end X1 of the optical fiber X:

$$\theta 1 = a\tan(Yin1/f1) \tag{1}$$

Figure 6:
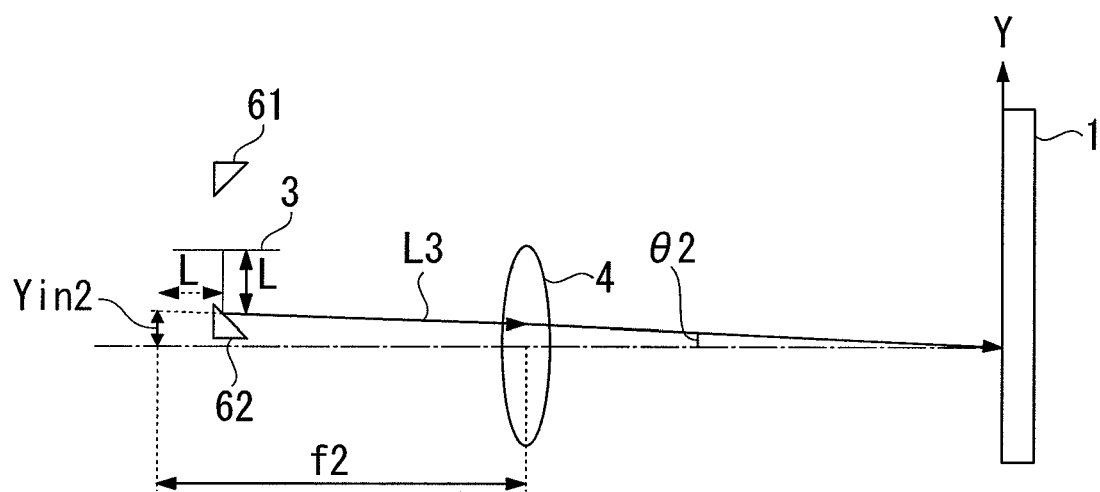
FIG. 6 is also a schematic diagram for explaining the method for making the incident angle θ1 of the measured light L1 and the incident angle θ2 of the light which has passed through the first slit coincide with each other.

On the other hand, as shown in FIG. 6, the incident angle $\theta 2$ (measured from the direction perpendicular to the Y direction) of the light L3 emitted from the second collimator lens 4 onto the diffraction grating 1 is represented by the following formula (2) by using the focal length f2 of the second collimator lens 4 and the height "Yin2" (image height) measured from the optical axis of the second collimator lens 4 to the emission point of the light L3.

In the actual spectroscope 100 of the present embodiment, as the light L3 is reflected by the second reflection mirror 62 of the light guide unit 6, the emission point of the light L3 is considerably distant from the optical axis. However, for the height Yin2 used for computing the formula (2), an assumption is employed in which the optical path between the second reflection mirror 62 and the second collimator lens 4 is extended by the distance L measured from the second reflection mirror 62 to the emission point (i.e., the first slit 3) of the light L3, and the emission point of the light L3 is present at the position defined by such extension.

$$\theta 2 = a\tan(Yin2/f2) \quad (2)$$

In order to make the incident angle θ1 and the incident angle θ2 coincide with each other, if the focal length f1 of the first collimator lens 2 is equal to the focal length f2 of the second collimator lens 4, then the image heights (Yin1 and Yin2) of the collimator lenses should coincide with each other (see formulas (1) and (2)).

If the focal length f1 of the first collimator lens 2 is not equal to the focal length f2 of the second collimator lens 4, then the image heights (Yin1 and Yin2) of the collimator lenses should be controlled so as to make the incident angle θ1 and the incident angle θ2 coincide with each other.

When the first collimator lens 2 and the second collimator lens 4 are arranged based on the above formulas (1) and (2), the incident angle θ1 of the measured light L1 emitted from the first collimator lens 2 onto the diffraction grating 1 can coincide with the incident angle θ2 of the light L3 emitted from the second collimator lens 4 onto the diffraction grating 1, where each incident angle is measured from the direction perpendicular to the Y direction.

When the incident angle θ1 of the measured light L1 emitted from the first collimator lens 2 onto the diffraction grating 1 coincides with the incident angle θ2 of the light L3 emitted from the second collimator lens 4 onto the diffraction grating 1, as described above, then the light L5 having a desired wavelength can be emitted without moving the second slit 5 in accordance with the rotation angle of the diffraction grating 1.

Figure 7:
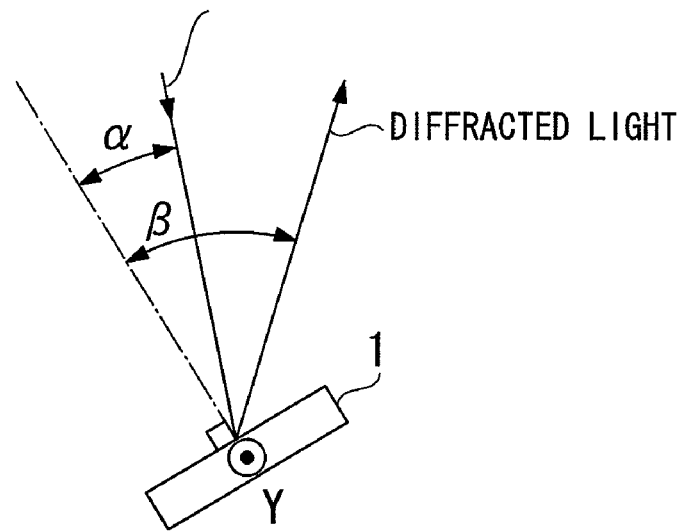
FIG. 7 is also a schematic diagram for explaining the method for making the incident angle θ1 of the measured light L1 and the incident angle θ2 of the light which has passed through the first slit coincide with each other.

More specifically, in a double-path spectroscope (or double-path monochromator), the wavelength λ1 of light emitted from a first slit is defined by the following formula (3), and the wavelength λ2 of light emitted from a second slit is defined by the following formula (4), where "m" indicates the order of diffraction, and "d" indicates the grating interval of the diffraction grating. Additionally, as shown in FIG. 7, "α" indicates the incident angle (oblique angle) of the measured light for the reflection plane of the diffraction grating, and "β" indicates the emission angle (oblique angle) of the diffracted light for the reflection plane of the diffraction grating.

$$m \cdot \lambda 1 = d \cdot (\cos\theta 1)\cdot(\sin\alpha + \sin\beta) \quad (3)$$

$$m \cdot \lambda 2 = d \cdot (\cos\theta 2)\cdot(\sin\alpha + \sin\beta) \quad (4)$$

As understood by the formulas (3) and (4), when the incident angle θ1 of the measured light L1 emitted from the first collimator lens 2 onto the diffraction grating 1 coincides with the incident angle θ2 of the light L3 emitted from the second collimator lens 4 onto the diffraction grating 1 (where each incident angle is measured from the direction perpendicular to the Y direction), then the wavelength λ1 of the light emitted from the first slit coincides with the wavelength λ2 of the light emitted from the second slit, regardless of the rotation angle of the diffraction grating 1.

Therefore, when the incident angle θ1 and the incident angle θ2 are set to the same angle, the light L5 having a desired wavelength can be emitted without moving the second slit 5 in accordance with the rotation angle of the diffraction grating 1.

In contrast, in a conventional double-path spectroscope using a single collimator lens, it is difficult to make the incident angles θ1 and θ2 coincide with each other. Therefore, such a conventional spectroscope employs a structure in which the second slit is moved in accordance with the rotation angle of the diffraction grating, or another structure for providing a symmetrical arrangement for the incident positions of the measured light or the positions of the first and second slits, so as to make the incident angles θ1 and θ2 coincide with each other and transmit the light having a desired wavelength through the first and second slits (see Patent Document 1).

However, in the conventional structures, if the second slit is moved, a mechanism for moving the second slit is necessary, which increases the size of the spectroscope, and complicates the entire mechanism and control. In addition, a single collimator lens must be used, and thus on the diffraction grating, the irradiation area irradiated by the measured light completely overlaps the irradiation area irradiated by the light which has passed through the first slit. Therefore, in contrast with the present embodiment, it is impossible to prevent the degradation of the resolution and dynamic range in the spectroscopic characteristics.

As described above, in accordance with the spectroscope 100 of the present embodiment, it is possible to prevent the degradation of the resolution and dynamic range in the spectroscopic characteristics. In addition, it is unnecessary to move the second slit 5 based on the rotation angle of the diffraction grating 1, thereby preventing the degradation of the resolution and dynamic range in the spectroscopic characteristics, by using a simple structure.

In the spectroscope 100 having the above-described structure in the present embodiment, the measured light L1 emitted from the output end X1 of the optical fiber X is collimated by the first collimator lens 2, and is incident on the diffraction grating 1. The measured light 1 incident on the diffraction grating 1 is spectroscopically dispersed, so that the diffracted light L2 is emitted from the diffraction grating 1.

The diffracted light L2 emitted from the diffraction grating 1 is converged through the first collimator lens 2, and then reflected by the first reflection mirror 61 of the light guide unit 6 toward the first slit 3, so that the light passes through the first slit 3. The first slit 3 transmits only light which has a target wavelength for the relevant measurement, so that the diffracted light L2 passing through the first slit 3 is emitted from the first slit 3 as the light L3 having the target wavelength.

The light L3 emitted from the first slit 3 is reflected by the second reflection mirror 62 of the light guide unit 6 toward the second collimator lens 4, so that the light is collimated by the second collimator lens 4 and is incident on the diffraction grating 1 again. In this process, on the diffraction grating 1, the irradiation area R2 of the light L3 does not overlap with the irradiation area R1 of the measured light L1, and is offset from R1 in the Y direction. The light L3 incident on the diffraction grating 1 is then spectroscopically dispersed, so that the diffracted light L4 is emitted from the diffraction grating 1.

The diffracted light L4 emitted from the diffraction grating 1 is converged by the second collimator lens 4, and then passes through the second slit 5. The second slit 5 transmits only light which has the target wavelength for the relevant measurement, so that the diffracted light L4 passing through the second slit 5 is emitted from the second slit 5 as the light L5 having the target wavelength.

That is, in the spectroscope 100 of the present embodiment, the measured light L1 is spectroscopically dispersed by means of the first spectroscopic path 10 which has the first collimator lens 2 and the first slit 3, and the measured light L1

(i.e., light L3) is further spectroscopically dispersed by means of the second spectroscopic path 20 which has the second collimator lens 4 and the second slit 5, thereby extracting the light L5 having the desired wavelength.

Additionally, in the spectroscope 100 of the present embodiment, the wavelength of the light L5 can be set to any desired value by controlling the rotation angle of the diffraction grating 1.

As described above, in accordance with the spectroscope 100 of the present embodiment, on the diffraction grating 1, the irradiation area R1 irradiated by the measured light L1 and the irradiation area R2 irradiated by the light L3 do not overlap with each other, and are offset from each other in the Y direction. Therefore, the scattered light produced when the measured light L1, which has been emitted from the first collimator lens 2, is launched into the diffraction grating 1, does not overlap with the optical path of the diffracted light L4.

Therefore, in a multipath spectroscope, it is possible to prevent the degradation of the resolution and dynamic range in the spectroscopic characteristics, which is caused when part of the scattered light, which has been produced on a spectroscopic path (i.e., the first spectroscopic path 10 in the present embodiment) prior to the last spectroscopic path (i.e., the second spectroscopic path 20 in the present embodiment), proceeds along the same optical path as that of the diffracted light L4 on the last spectroscopic path.

Also in accordance with the spectroscope 100 of the present embodiment, the incident angle θ1 of the measured light L1 emitted from the first collimator lens 2 onto the diffraction grating 1 coincides with the incident angle θ2 of the light L3 emitted from the second collimator lens 4 onto the diffraction grating 1, where each incident angle is measured from the direction perpendicular to the Y direction. Therefore, it is possible to emit the light L5 having a desired wavelength, without moving the second slit 5 in accordance with the rotation angle of the diffraction grating 1.

Second Embodiment

Below, a second embodiment of the present invention will be explained, where explanations of parts corresponding to those in the first embodiment are omitted or simplified.

Figure 8:
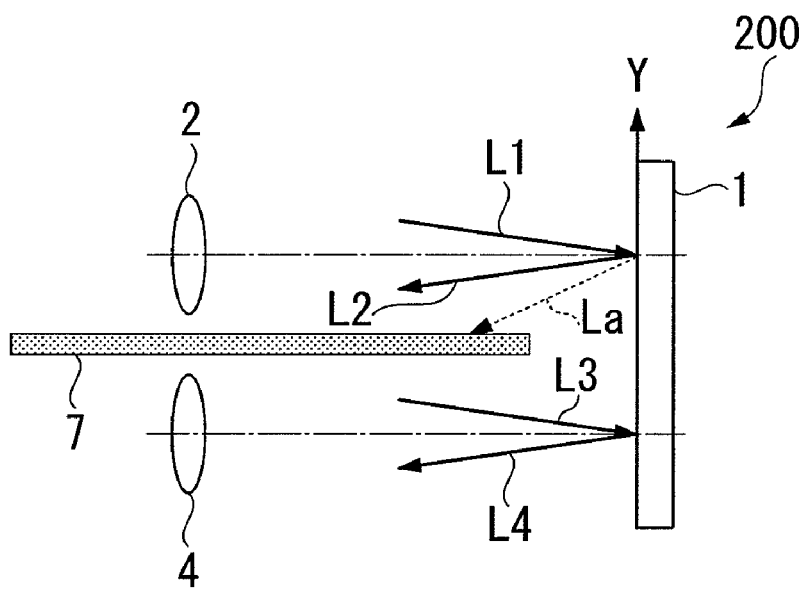
FIG. 8 is a schematic enlarged view of a part where the diffraction grating, the first collimator lens, and the second collimator lens are arranged in a spectroscope as a second embodiment of the present invention.

FIG. 8 is a schematic enlarged view of a part where the diffraction grating 1, the first collimator lens 2, and the second collimator lens 4 are arranged in a spectroscope 200 of the present embodiment.

As shown in FIG. 8, the spectroscope 200 of the present embodiment has a light shield plate 7 (i.e., light shield device) between the first collimator lens 2 of the first spectroscopic path 10 and the second collimator lens 4 of the second spectroscopic path 20.

The light shield plate 7 is arranged on the side of the diffraction grating diffraction grating 1 and is thus not arranged in the area where the first slit 3 and the light guide unit 6 are provided. In other words, the light shield plate 7 is arranged at a part of the area except for the guide path of the light guide unit 6.

As the light shield plate 7 is provided between the first collimator lens 2 of the first spectroscopic path 10 and the second collimator lens 4 of the second spectroscopic path 20, it is possible to prevent the scattered light La, which is produced when the measured light L1 is incident on the diffraction grating 1, from being launched into the second spectroscopic path 20.

Therefore, in accordance with the spectroscope 200 of the present embodiment, it is possible to further reliably prevent the scattered light, which is produced when the measured light L1 is incident on the diffraction grating 1, from passing through the second slit 5.

The light shield plate 7 may be arranged, not only on the side of the diffraction grating diffraction grating 1 (i.e., in the area except for the guide area where the first slit 3 and the light guide unit 6 are provided), but also the opposite side to the diffraction grating 1 with respect to the guide area.

Third Embodiment

Below, a third embodiment of the present invention will be explained, where explanations of parts corresponding to those in the first embodiment are omitted or simplified.

Figure 9:
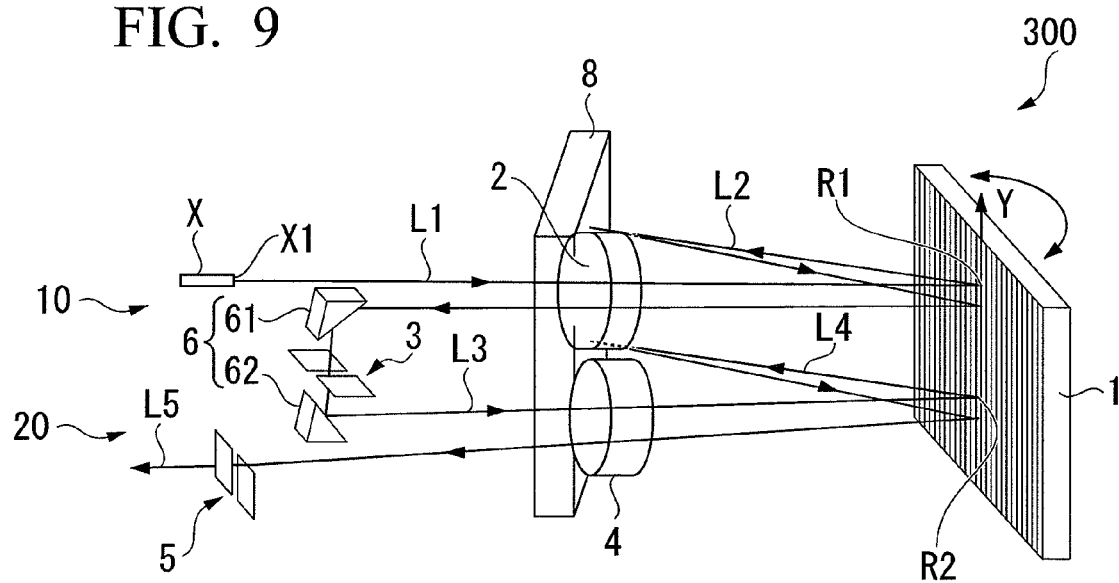
FIG. 9 is a schematic perspective view showing the general structure of a spectroscope as a third embodiment of the present invention.

FIG. 9 is a schematic perspective view showing the general structure of a spectroscope 300 of the third embodiment. As shown in FIG. FIG. 9, the spectroscope 300 of the present embodiment has a plane mirror 8 which is arranged beside the first collimator lens 2 and the second collimator lens 4, and reflects the diffracted light L2 and L4 (return light) emitted from the diffraction grating 1, so that the return light is incident on the diffraction grating 1 again.

In the spectroscope 300 of the present embodiment, the first collimator lens 2 and the second collimator lens 4 are arranged in a manner such that the diffracted light L2 and the diffracted light L4, which are emitted from the diffraction grating 1, proceed to the plane mirror 8.

The position of the plane mirror 8 is determined so as to direct the diffracted light (each of L2 and L4) into the diffraction grating 1 along the same optical path.

In accordance with the spectroscope 300 having the above-described structure in the present embodiment, the diffracted light L2 emitted from the diffraction grating 1 is reflected by the plane mirror 8, and is spectroscopically redispersed by the diffraction grating 1. After that, the light is incident on the first slit 3 via the first collimator lens 2. That is, the measured light L1 emitted from the output end X1 of the optical fiber X is spectroscopically dispersed twice, and then passes through the first slit 3.

In addition, the diffracted light L4 emitted from the diffraction grating 1 is reflected by the plane mirror 8, and is spectroscopically redispersed by the diffraction grating 1. After that, the light is incident on the second slit 5 via the second collimator lens 4. That is, the light L3 which has passed through the first slit 3 is spectroscopically dispersed twice, and then passes through the second slit 5.

Therefore, in accordance with the spectroscope 300 of the present embodiment, the measured light L1 is spectroscopically dispersed twice by means of the first spectroscopic path 10, and the measured light L1 (i.e., light L3) is further spectroscopically dispersed twice by means of the second spectroscopic path 20, thereby improving the resolution and dynamic range in the spectroscopic characteristics.

Also in the spectroscope 300 of the present embodiment, when the incident angle θ1 of the measured light L1 emitted from the first collimator lens 2 onto the diffraction grating 1 coincides with the incident angle θ2 of the light L3 emitted from the second collimator lens 4 onto the diffraction grating 1 (where each incident angle is measured from the direction perpendicular to the Y direction), then the light L5 having the desired wavelength can be emitted without moving the second slit 5 in accordance with the rotation angle of the diffraction grating 1.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, the above-described embodiments each employ a spectroscope having two spectroscopic paths such as the first spectroscopic path 10 and the second spectroscopic path 20 (i.e., a double-path spectroscope).

However, the present invention is not limited to this condition, and can be applied to a spectroscope having a larger number of the spectroscopic paths.

Even when the present invention is applied such a spectroscope having a larger number of the spectroscopic paths, each spectroscopic path has a collimator, and each collimator is arranged in a manner such that the irradiation areas (on the diffraction grating) irradiated by light emitted from each collimator are offset from each other in the direction along the ruled lines of the diffraction grating.

Also in the above-described embodiments, the first collimator lens 2 and the second collimator lens 4 are used as the collimators of the present invention.

However, the present invention is not limited to this condition, and the collimators of the present invention may each be a parabolic mirror.

Also in the above-described embodiments, the irradiation area R1 of the measured light L1 emitted from the first collimator lens 2 and the irradiation area R2 of the light L3 emitted from the second collimator lens 4 are offset from each other in the Y direction on the diffraction grating 1.

However, the present invention is not limited to this condition, and the irradiation area R1 and the irradiation area R2 may be offset in a direction which includes a Y-direction component, that is, in an oblique direction on the diffraction grating 1.

Also in the above-described embodiments, the irradiation area R1 of the measured light L1 emitted from the first collimator lens 2 and the irradiation area R2 of the light L3 emitted from the second collimator lens 4 do not overlap each other on the diffraction grating 1.

However, the present invention is not limited to this condition, and the irradiation area R1 and the irradiation area R2 may partially overlap with each other on the diffraction grating 1. Even when the irradiation area R1 and the irradiation area R2 partially overlaps with each other, it is possible to reduce the possibility such that the scattered light, which is produced when the measured light is incident on the diffraction grating 1, passes through the second slit 5, in comparison with the case where both the irradiation areas completely overlap each other.

Also in the above-described embodiments, the first collimator lens 2 and the second collimator lens 4 are separate parts.

However, the present invention is not limited to this condition, and the first collimator lens 2 and the second collimator lens 4 may be molded as an integrated body by using resin or the like.

Also when the collimators of the present invention are each a parabolic mirror, as described above, a plurality of parabolic mirrors may be molded as an integrated body by using resin or the like.

What is claimed is:

1. A spectroscope comprising:
    a diffraction grating having a plurality of ruled parallel lines; and
    a plurality of spectroscopic paths, each of which has a collimator for collimating incident light, emits the collimated light to the diffraction grating, converges return light, which returns from the diffraction grating, by the collimator, and emits the converged light through a slit which is provided for wavelength selection and positioned at the focus of the collimator, wherein:
    measured light is emitted through the plurality of spectroscopic paths so as to extract light which is included in the measured light and has a predetermined wavelength; and
    the collimators of the spectroscopic paths are arranged so that on the diffraction grating, irradiation areas of light emitted from the collimators are offset from each other at least in a direction along the ruled parallel lines.

2. The spectroscope in accordance with claim 1, wherein:
    the collimators of the spectroscopic paths are arranged so that incident angles of light emitted from the collimators to the diffraction grating coincide with each other, where the incident angles are measured from a direction perpendicular to the ruled parallel lines.

3. The spectroscope in accordance with claim 1, further comprising:
    a light guiding device for guiding the measured light between any two of the spectroscopic paths; and
    a light shield device arranged in at least a part of an area which is defined between said any two of the spectroscopic paths, except for the guide path of the light guiding device.

4. The spectroscope in accordance with claim 1, further comprising:
    a reflection device for receiving the return light emitted from the diffraction grating at a predetermined emission angle, and reflecting the received light so as to emit the received light to the diffraction grating.

* * * * *